Sept. 4, 1928.

A. H. SCHMIDTKE 1,682,769

APPARATUS FOR MAKING BASKETS AND THE LIKE

Filed Aug. 1, 1925   5 Sheets-Sheet 1

Fig. 1

Inventor
Albert H. Schmidtke.
By Eugene M. Giles Atty.

Sept. 4, 1928. 1,682,769
A. H. SCHMIDTKE
APPARATUS FOR MAKING BASKETS AND THE LIKE
Filed Aug. 1, 1925 5 Sheets-Sheet 4

Inventor
Albert H. Schmidtke
By Eugene M. Giles
Atty.

Sept. 4, 1928.  1,682,769
A. H. SCHMIDTKE
APPARATUS FOR MAKING BASKETS AND THE LIKE
Filed Aug. 1, 1925  5 Sheets-Sheet 5
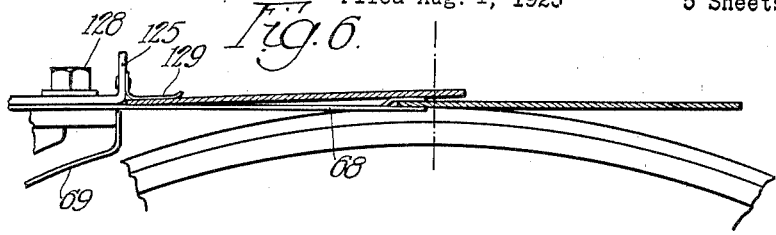
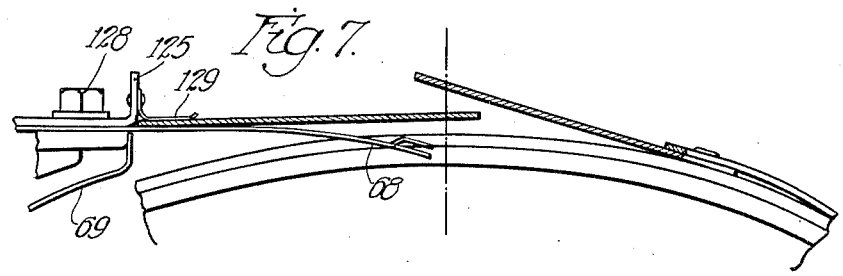
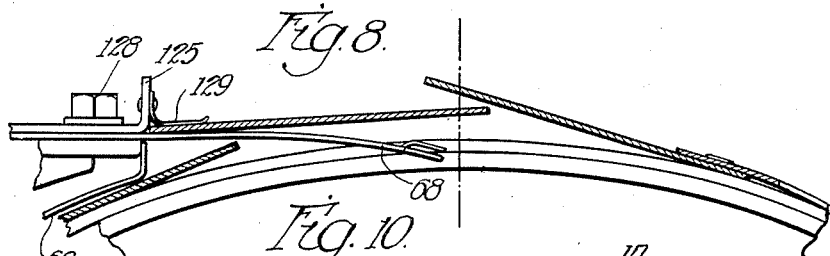
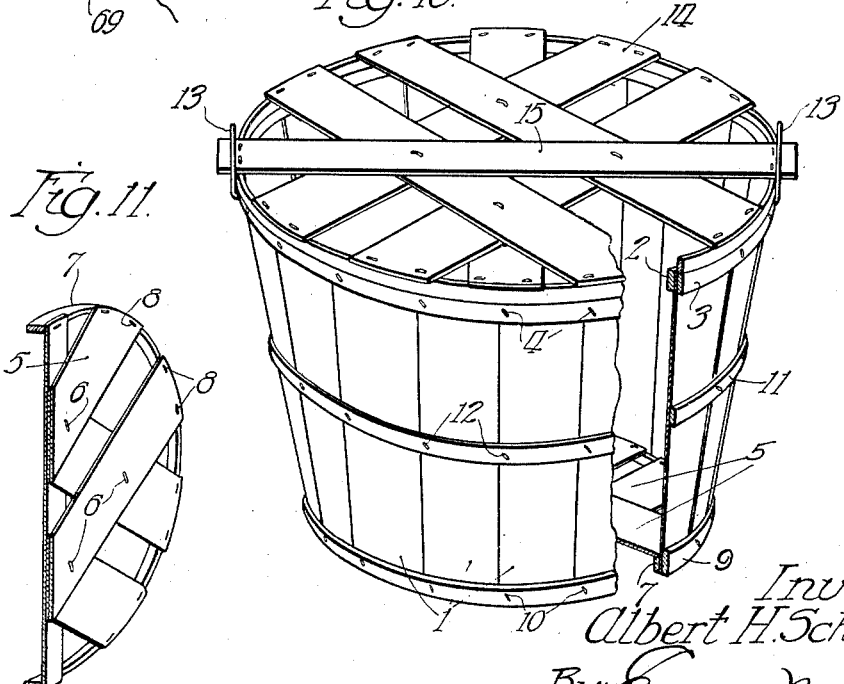
Inventor
Albert H. Schmidtke
By Eugene M. Gilroy
Atty.

Patented Sept. 4, 1928.

UNITED STATES PATENT OFFICE.

ALBERT H. SCHMIDTKE, OF ST. JOSEPH, MICHIGAN, ASSIGNOR TO ST. JOSEPH IRON WORKS, OF ST. JOSEPH, MICHIGAN, A CORPORATION OF MICHIGAN.

APPARATUS FOR MAKING BASKETS AND THE LIKE.

Application filed August 1, 1925. Serial No. 47,429.

My invention relates to a machine for making baskets and similar receptacles and has reference more particularly to means whereby the annular shell of the basket or receptacle is formed, and the bottom of the basket or receptacle assembled in the annular shell.

The principal objects of my invention are to provide an improved machine for making a basket or other receptacle in which the annular wall of the basket or receptacle is formed of adjoining panels or staves which are secured successively to bands which serve to hold the panels or staves in their assembled relations; in which the proper relative location of the panels or staves during their assembling is provided for; in which means are provided for assembling a flanged bottom with the panels or staves and for securing the bottom to the panels or staves while they are being secured to the bands which hold them in assembled relation; and in general to provide a simple, convenient and efficient apparatus for constructing a basket which is provided with means whereby the annular walls of the basket may be formed of panels or staves and bands and with means for assembling with the panels or staves and bands a flanged bottom.

Figure 2:
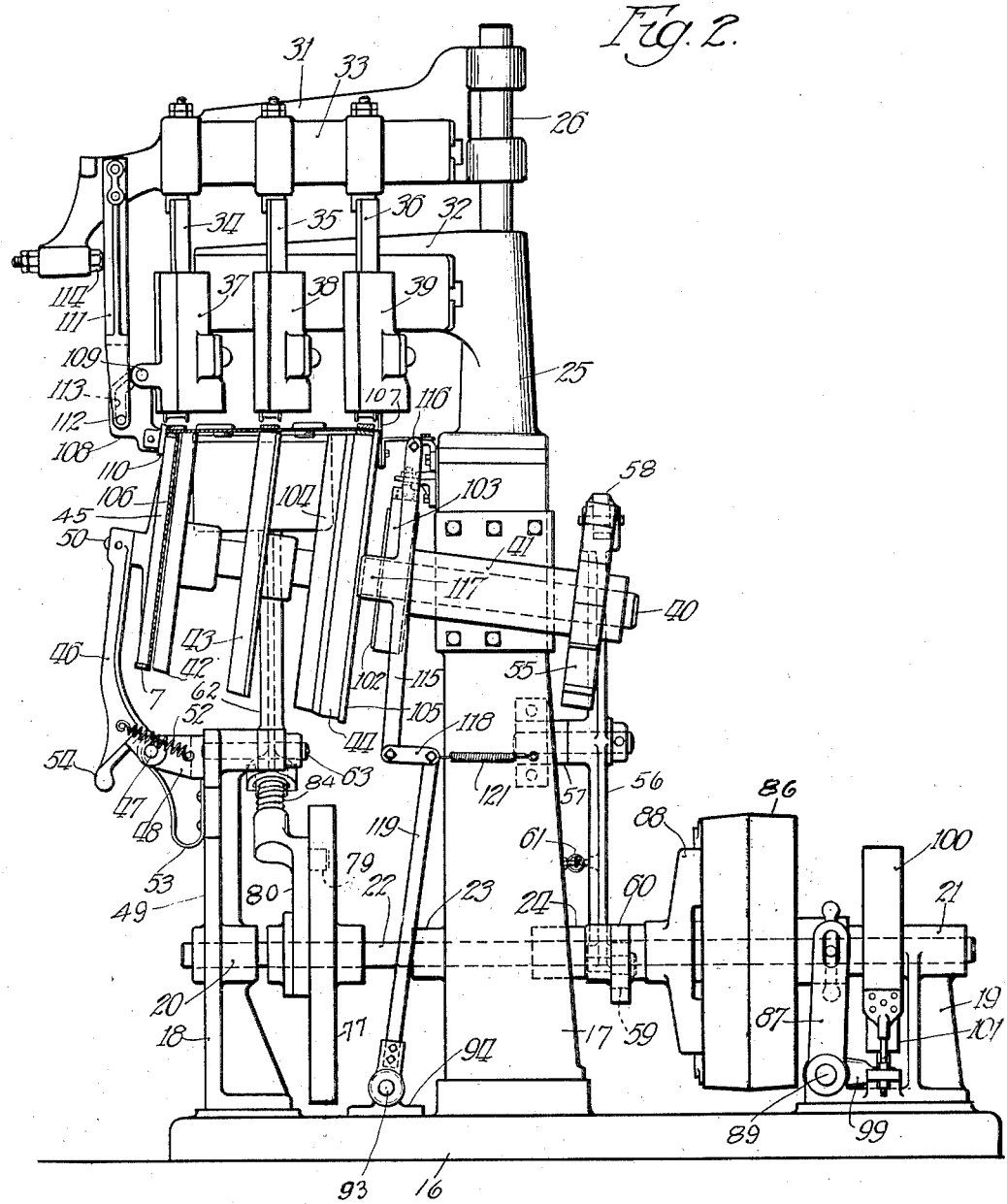

On the drawings, Fig. 1 is a perspective view of a basket making machine embodying my improvements;

Fig. 2, is a side view thereof.

Figure 3:
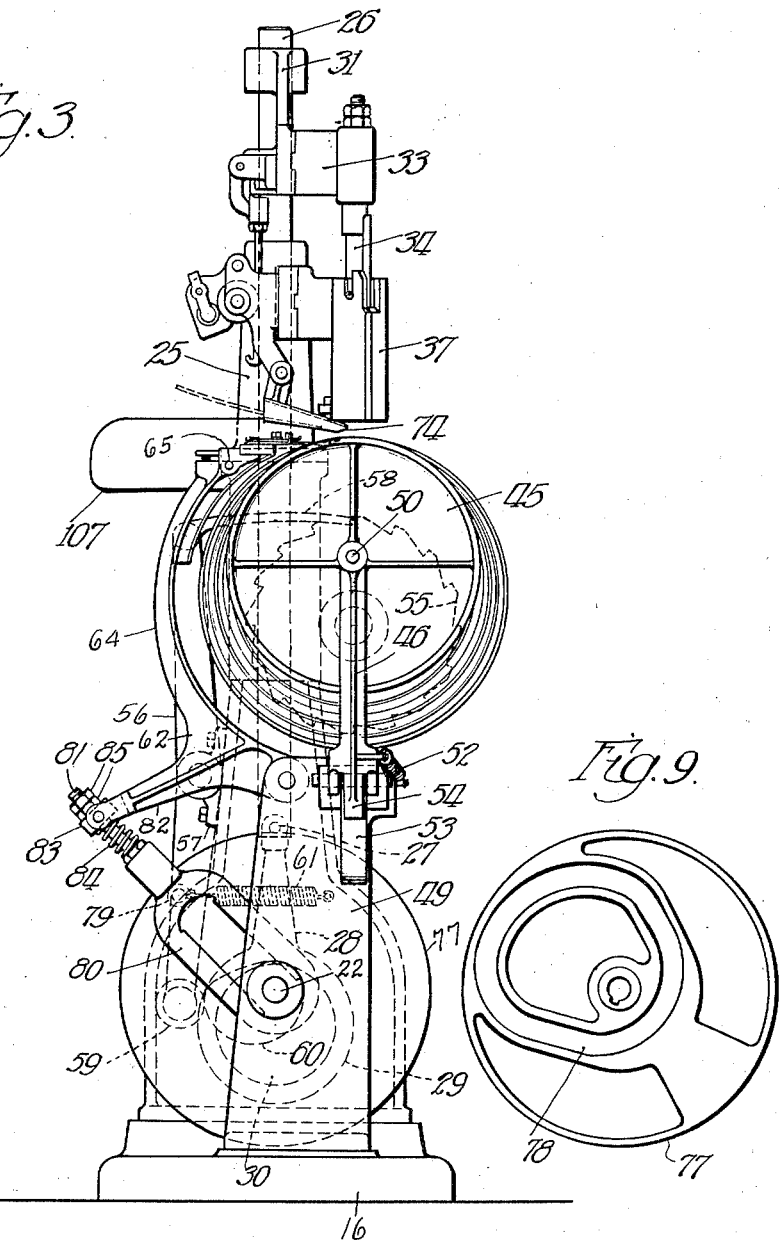
Figure 4:
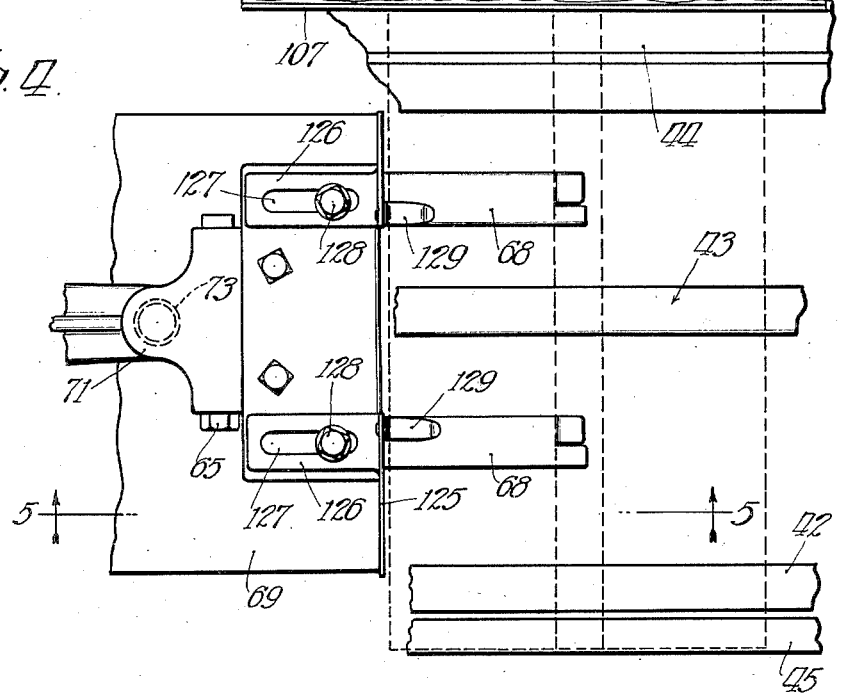
Figure 5:
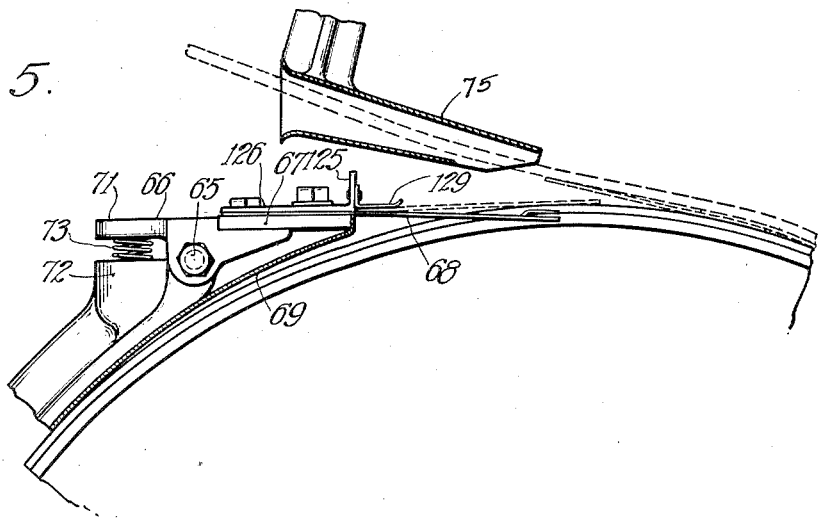

Fig. 3, an end view looking at the left of Fig. 2;

Fig. 4, an enlarged plan view of portions of the panel feeding mechanism and the form on which the basket is assembled;

Fig. 5, a view taken substantially on the line 5—5 of Fig. 4 and showing, in section, one of the guides for feeding the hoop stock;

Figs. 6, 7 and 8, detail views showing various steps in the stave feeding operations;

Fig. 9, a face view of the cam which operates the stave feeding mechanism.

Fig. 10, a perspective view with a portion broken away of the completed basket with handles attached and a cover applied thereto; and Fig. 11, a half section, in perspective, of a bottom such as I prefer to use in connection with the making of the basket.

Referring to the drawings and particularly to Fig. 10 which illustrates a basket of the type which my improved machine is designed to make, it will be observed that the basket comprises an annular wall or shell made up of panels or staves 1 which have their upper ends secured between inner and outer hoops 2 and 3 respectively by the staples 4. The basket bottom may consist of a single panel or strips arranged edge to edge or may be composed of a number of slats, crossed or otherwise arranged to sufficiently close the lower end of the basket, as for example, the crossed slats 5 which are secured together by the staples 6 to form a mat, and this mat or other form of bottom is secured to a marginal hoop 7 by nails, staples, or other suitable fasteners 8, said hoop being of the proper size to fit snugly in the lower end of the annular basket wall or shell composed of the panels or staves 1. Another hoop 9, preferably a little wider than the hoop 7, extends around the lower end of the annular shell or wall of the basket and the lower ends of the panels 1 are clamped or secured between the hoops 7 and 9 by the staples 10 or other fasteners which serve to hold the basket bottom in place. An intermediate band or hoop 11 is preferably applied around the basket wall or shell substantially midway between the hoops 3 and 9 and stapled or otherwise secured to the panels or staves as at 12. The adjoining panels 1 preferably have their edges overlapped and the staples 4, 12 and 10 are preferably engaged through the overlapped portions of the adjoining panels as this arrangement of the staples or fasteners holds the overlapping edges close together and affords a more rigid construction than if the fasteners were applied at intermediate points between the lateral edges of the staves or panels 1.

In practice it is customary to provide handles 13 at diametrically opposite points at the top of the basket and to employ a cover somewhat as shown at 14 with a slat 15 projecting beyond the edges thereof and engaging with the handles 13 to close the upper end of the basket. The handles and basket cover, however, form no part of my present invention and are merely mentioned to afford a complete understanding of the type of basket referred to.

My present apparatus is designed to make a basket of the type which I have just described, and in the apparatus or machine there is a supporting base 16 which has an upright housing 17 between the ends, and standards 18 and 19 adjacent the opposite ends respectively having bearings 20 and 21 respectively in which the main shaft 22 is journaled to rotate, said shaft being passed through the housing 17 and journaled in bearings 23 and 24 with which the housing 17 is formed.

The housing 17 extends upwardly well above the base 16 as shown and is provided with or carries a long bearing 25 in which a shaft 26 is mounted to reciprocate, said shaft having a link 28 pivoted thereto at the lower end as indicated in Fig. 3 and this link has an eccentric strap 29 at the lower end engaged around an eccentric 30 which is fixed on the shaft 22 so that the shaft 26 is reciprocated by the rotation of the shaft 22. A bracket arm 31 is secured to the upper end of the shaft 26 and projects laterally therefrom substantially over a corresponding stationary bracket arm 32 on the housing 17 or bearing 25 and said bracket arm 31 supports a frame or head 33 of a multiple stapling mechanism which in the present case comprises three suitably spaced stapling devices 34, 35 and 36 working in conjunction with the respective guides 37, 38 and 39 and suitable staple feeding and forming mechanism to apply staples respectively through the hoops 9, 11 and 3. The stapling devices and the staple feeding and forming mechanisms are not shown as they are well known in the art and any satisfactory form of stapling mechanism may be used.

A shaft 40 is journaled to rotate in a bearing 41 on the side of the housing 17 so that it projects under the series of staplers 34, 35 and 36, and this shaft has three disks 42, 43 and 44 secured thereon of successively larger diameter so as to serve as a form for a tapered annular shell or basket wall. The shaft 40 is suitably inclined as shown particularly in Fig. 2 so that the upper extremities of the disks 42, 43 and 44 are in a horizontal plane, the disks 43 and 44 being arranged so that the upper portions are directly below the staplers 35 and 36 and the peripheral faces of these disks 43 and 44 are adapted to cooperate with the staplers 35 and 36 to clinch the staples which are applied by said staplers 35 and 36. The disk 42, however, is not located with the upper portion directly under the stapler 34 but is arranged at the inner side of the line of operation of the stapler 34 or nearer to the housing 17 or bearing 25 so that a disk 45 may be brought up close to the outer face of the disk 42 in a position in which the upper portion of the disk 45 is directly under the stapler 34, said disk 45 being formed with a peripheral face against which the staples, driven by the stapler 34, are clinched.

The disk 45 is adapted to support the basket bottom during the operation of forming the annular wall or shell of the basket and is mounted on a bracket or arm 46 so as to swing to and from a position adjacent the disk 42, said bracket or arm 46 being pivoted at 47 on a bracket 48 which is formed as a part of or secured to an upwardly projecting extension 49 of the standard 18. In the operation of forming the basket the shaft 40 and disks 42, 43 and 44 thereon are rotated as a unit in a step by step manner and it is desirable that the disk 45 advance or rotate in unison therewith. To this end the disk 45 is rotatably mounted upon the upper end of the bracket or arm 46 in any convenient manner as for example by a headed pin or shaft 50 which is secured or fixed in a suitable aperture in the upper end of the arm 46.

As a preliminary to the operation of making the basket, an annularly flanged basket bottom, as for example such as shown in part in Fig. 11, is placed on the disk or form 45 while the latter is in the position shown in Fig. 1, with the mat or bottom slats or panels resting on the upper surface of the disk or form 45 and the bottom hoop 7 depending around the disk or form 45 and fitting somewhat closely against the peripheral edge of said disk, after which the disk 45 is thrown up to the position shown in Figs. 2 and 3 in which the mat of the basket bottom is clamped between the disks 42 and 45 and the bottom hoop 7 thereby held in a position overlying the peripheral edge of the disk 45.

The hoop 7 of the basket bottom is usually formed of a band which is bent into circular form with the ends overlapped and fastened together. To accommodate the irregularity at the inner side of the hoop 7 where the ends overlap, and to insure a solid backing and closely adjoining surface all around the inside of the hoop 7 for driving and clinching the staples, the disk or form 45 is formed as shown in Fig. 1 with a stepped edge or offset 51 against which the end of the inside overlapping end of the hoop 7 abuts when the basket bottom is placed in position on the disk 45.

A spring 52 is connected at one end to the bracket 48 and at the other end to the swinging arm 46 so as to throw over center when the arm 46 is swung to the upright position and hold the disk 45 and the basket bottom thereon against the disk 42 during the operation of forming the basket. This spring is thrown to the other side of the axis of the pivot 47 when the arm 46 is turned down to the position shown in Fig. 1 and holds the disk 45 in the retracted position. A leaf spring 53 is mounted on the extension 49 of the standard 18 and is turned upwardly as shown in Figs. 1 and 2 so as to be engaged by a bumper extension 54 of the arm 46 when the latter is swung downwardly to afford a yielding stop for limiting the down throw of the arm 46 and disk 45 and cushioning the final movement thereof.

For operating the shaft 40 and basket forming disks 42, 43 and 44, said shaft is provided with a ratchet wheel 55 thereon having a number of teeth in accordance with the number of panels of which the basket wall is to be formed and whereby the shaft 40 and disks 42, 43 and 44 are advanced one step in every revolution of the main shaft 22. For operating the ratchet wheel 55 a rocker arm 56 is pivoted about midway between its ends on a bracket 57 on the housing 17 and this arm 56 has pawl 58 pivoted to its upper end and resting by gravity on the upper peripheral portion of the ratchet wheel 55. The lower end of this arm 56 carries a roller 59 which engages the periphery of the cam 60 which latter is fixed on the shaft 22 and properly formed to advance the ratchet wheel 55 a distance of one tooth during the time that the stapling mechanisms 34, 35 and 36 are elevated. A spring 61 having one end attached to the lever 56 and the other end attached to the housing 17 serves to hold the roller 59 in constant contact with the periphery of the cam 60.

In forming the basket wall the staves or panels 1 are fed laterally over onto the top of the disks 42, 43 and 44 and the disk 45 by a feeding and positioning device which is timed for operation with the ratchet mechanism and the stapling mechanism so that a stave or panel is placed in position just previous to each operation of the stapling devices 34, 35 and 36. This feeding device comprises a lever 62 which is pivoted on a spindle 63 at the upper end of the standard extension 49, said spindle being supported in a hub at the upper end of said standard extension. The lever 62 has a curved arm 64, to the upper end of which is pivoted at 65, a bracket 66 which in turn has a transverse plate 67 secured thereon and carrying a pair of spaced holders for the staves. Each of these holders comprises a substantially flat leaf spring or finger 68 which is forked at the outer end to admit the lateral edge of a stave, as indicated in Fig. 6. Adjacent each holder 68 is a stop plate 125 with a rearwardly extending arm 126 having a slot 127 for a cap screw 128 which serves to secure the stop plate 125 and the adjoining finger 68, as well, to the plate 67. Each stop plate 125 has a clip 129 secured thereto and projecting forwardly a short distance over the respective finger or holder 68 and formed with an upturned outer end so as to receive and hold a stave thereunder as shown in Figs. 6 to 8 inclusive. An apron 69 is secured to the plate 67 and is curved so as to conform somewhat to the shape of the annular wall of the basket. The bracket 66 has a tail portion 71 directly above a corresponding portion 72 on the upper end of the arm 64, between which the spring 73 is interposed whereby the staves as they are fed forwardly are caused to bear against the tops of the disks 42, 43 and the hoop on the disk 44.

Above each disk 43 and 44, and the disk 45 when the latter is in the up-raised position are guides 74, 75 and 76 which serve to guide bands or hoop stock to the proper position for stapling onto the panels 1.

For operating the rocker arm 62, a cam disk 77 is fixed on the shaft 22 and provided with a channel 78 for a roller 79 which latter is carried on the side of a slotted frame 80 which straddles the shaft 22 and has its outer end connected by the rod 81 with the lower arm 82 of the lever 62. The channel 78 is omitted from the cam in Fig. 3 so as to clearly disclose the dotted line parts behind this cam, but the face of the cam 77 is shown in Fig. 9 at the side of Fig. 3 as it should appear in the latter figure. The end of the arm 82 is preferably bifurcated or forked and has a collar 83 pivoted between the forked ends of the arm 82, and this collar loosely engages the rod 81 and is held against a spring 84 on the rod 81 by a pair of lock nuts 85.

The shaft 22 may be operated in any convenient manner, as for example by belt connection to the pulley 86 which is loose on the shaft 22 and adjustable by the shifting fork 87 to engage with and disengage from a clutch 88 which is fixed on the shaft 22. This clutch fork 87 is fixed on a shaft 89 which is journaled on an extended portion of the standard 19 and provided with an arm 90 at one end which is connected to a spring 91 which serves to exert a tension to release the pulley 86 from the clutch. A pedal 92 is loosely mounted on a shaft 93 which latter is journaled in a bracket 94 on the base 16, and the pedal arm has an upright portion 95 connected by the link 96 to the upright arm 90 of the clutch shifting mechanism so that when the pedal 92 is depressed, the pulley 86 is shifted to engage the clutch. The shaft 89 which carries the clutch shifting mechanism has an arm 99 fixed thereon and connected to the free end of a brake band 100 which extends over a brake drum 101 on the shaft 22 so that when the pedal 92 is released, the spring 91 releases the pulley 86 from the clutch and simultaneously exerts a pull on the end of the brake band 100 whereby the latter is caused to frictionally engage the drum 101 for stopping the machine promptly upon release of the clutch.

A brake drum 102 is also secured on the shaft 40 and engaged by a band 103 which merely has sufficient retarding effect on the operation of the shaft 40 to prevent overthrow in the step by step operation which is imparted thereto through the pawl 58 and ratchet wheel 55.

In baskets of the type which this machine is designed to make, it is customary to apply a hoop, indicated at 2 in Fig. 10, to the inside of the basket at the upper end and the disk 44 is of a suitable size so that the hoop 2 may be placed thereon previous to the formation of the basket, said disk being preferably provided with a reduced and tapered portion 104 which permits the hoop 2 to be readily inserted in place thereon, and this disk also has an annular shoulder 105 against which the hoop engages when applied.

In the operation of the machine the disk 45 is swung down to position shown in Fig. 1 and the hoop 2 which has been previously formed is then inserted in place on the disk 44, being passed over the disks 42 and 43 into the final position on the disk 44. A basket bottom similar to that shown in Fig. 11 and indicated as a whole at 106 is placed on the disk 45 with the hoop 7 engaged around the disk, after which this disk 45 with the bottom 106 thereon is thrown up to the position shown in Fig. 2 wherein the spring 52 acts to hold the disk 45 with the basket bottom 106 thereon against the disk 42. Staves 1 of the proper length and width having been previously prepared are then fed to the machine by the operator and the strips to form the hoops 9, 11 and 3 are started in the guides 74, 75 and 76 respectively.

To start the basket, a stave or panel 1 is placed in engagement with the forked ends of the holders 68 as shown in Fig. 6 and another panel or stave is placed on the holders 68 and under the clips 129, likewise as shown in said Fig. 6, and the forward ends of the strips which are designed to form the hoops 9, 11 and 3 are adjusted to a position directly under the stapling devices 34, 35, and 36. The pedal 92 is then depressed, whereupon the arm 64 is rocked so as to position the two staves shown in Fig. 6 so that the overlapped portions of the staves are directly under the stapling devices 34, 35 and 36 and also directly under the forward ends of the hoop bands. As the shaft 22 continues to rotate after the staves have been advanced to the stapling position and are held in said position by the outermost portion of the cam groove 78, the eccentric 30 acts to depress the stapling devices 34, 35 and 36 and drives three staples 10, 12 and 4 respectively through the ends of the hoop strips 9, 11 and 3 and the overlapped portions of the two panels shown in Fig. 6, the staple 10 being passed also through the hoop 7 on the basket bottom and clinched against the periphery of the disk 45, while the staple 12 is merely driven through the hoop strip 11 and the overlapped portions of the panels, and clinched against the periphery of the disk 43, while the staple 4 is passed through the end of the hoop strip 3, the overlapped portions of the panels 1, and also through the hoop 2 and clinched against the periphery of the disk 44.

After each stapling operation the panel feeding mechanism is retracted and at the same time the shaft 40 and disks thereon together with the panel and hoop structure just formed, is advanced by the pawl 58 and ratchet wheel 55 substantially the width of a stave 1 and while the stave feeding mechanism is retracted, the operator places another stave 1 under the clips 129 so that in the return movement of the feeding mechanism this latter stave is brought up to the stapling position wherein the foremost edge underlies the rear edge of the previously stapled stave as shown in Fig. 7. The bands which form the hoops 9, 11 and 3 are, of course, drawn forward by the advancing movement of the disks 45, 42, 43 and 44 and upon the next operation of the staplers 34, 35 and 36 the panel or stave which has just been brought up into position is stapled to these bands and to the rear edge of the preceding stave or panel. Successive staves or panels 1 are then placed in position on the feeding device by the operator and stapled to the hoop bands 9, 11 and 3 and to the edge of the preceding panel or stave until the annular shell or basket wall is completed, and the last stave which is shown in the stapling position in Fig. 8 overlies the forward edge of the first stave so that the next stapling operation secures the rear edge of the last applied panel or stave to the forward edge of the first stave or panel 1 and also to the hoop bands 9, 11 and 3. The hoop bands are made sufficiently long so that the ends overlap and after the annular shell or basket wall is completed the operation of the machine is continued without feeding any additional panels so as to staple together the overlapping portions of the hoops 9, 11 and 3.

To facilitate the placing of the staves in the proper position on the stave feeding mechanism a plate 107 is mounted on the housing 17 at the end of the basket form and extends alongside the path of movement of the stave feeding mechanism so that when the operator places a stave in the position on the feeding device it is merely necessary for him to place the edge of the stave in the forks of the fingers 68 and butt the stave endwise against the plate 107 and in a like manner place the successive staves under the clips 129 and butt the staves endwise against this plate.

As a further precaution to insure proper positioning of the staves on the basket form and to insure proper relative positioning of the two bottom hoops 7 and 9 and the end of the stave which is secured therebetween I have provided a hammer or tapping member 108 which is pivoted at 109 on the stationary member 37 of the stapler 34 and provided with a head 110 which strikes against the edges of the hoops 7 and 9 and the end of the stave just before the staple is applied and serves to insure engagement of the remote end of the stave against the plate 107 and to line up the edges of the hoops 7 and 9 and the lower end of the stave. This hammer 108 is operated from the stapler head 33 through a bar 111 which is bifurcated at the lower end so as to straddle the member 108 and provided with a pin 112 which engages through the slot 113 in the member 108. The slot 113 is of angular form, the upper portion thereof (referring to Fig. 2) serving to raise and lower the hammer 108 at the proper time by engagement of the pin 112 therewith, whereas the lower portion of the slot permits the stapling operation to be performed after the hammer 108 has engaged the hoops 7 and 9 and the end of the panel or slat. The bar 111 is mounted in a stationary manner on the head 33 but may be loosened up and adjusted by the screw or bolt 114 so as to vary the final position of the hammer head 110 as required.

In practice the machine operates in such a manner that the pedal 92 is held depressed throughout the making of the basket as the operator can ordinarily supply the staves to the feeding device as fast as required although it is to be understood that the operation of the machine may be interrupted at any time if desired by releasing the pressure on the pedal 92. When the basket is completed the pressure on the pedal 92 is released and the spring 91 thereupon shifts the pulley 86 sufficiently to disengage from the clutch 88 and at the same time the brake band 100 is tightened by said spring on the drum 101 and serves to insure a prompt stopping of the entire device. After the machine is stopped the disk 45 is swung down to the position shown in Fig. 1 so that the completed basket may be removed from the form.

To facilitate the removal of the basket, a frame 115 is pivoted at 116 on the housing 17 and arranged with pushers 117 at opposite sides of the form which are positioned to engage diametrically opposite edges of the completed basket. This frame 115 is connected at the lower end by a link 118 to an arm 119 on the shaft 93 which is operable by the pedal 120 to throw the frame 115 outwardly and release the completed basket from its position on the form or disks 42, 43 and 44. A spring 121 is attached at one end to the lower end of the frame 115 in any convenient manner and at the other end to the housing 17 so as to normally hold the stripper or frame 115 in the retracted position so that after the pressure is released on the pedal 120, the frame 115 returns to the normal position which is shown in Fig. 2.

The stapling devices 34, 35 and 36 and their cooperating stationary parts 37, 38, and 39 are preferably adjustable on the brackets or heads 33 and 32 respectively so that different spacing of the hoops may be had and the stops 125 are adjustable so that the panels of different widths may be used, in which case the ratchet wheel 55 may be replaced by the ratchet wheel of the proper number of teeth to obtain the proper advance movement of the form, and if necessary the cam 60 may be replaced by a cam which will impart the different range of movement to the pawl 58. The nuts 85 may also be adjusted if necessary to regulate the stroke of or final position of the feeding device.

The pivotal mounting of the stave feeding head at 65 together with the spring 73 serves to permit the necessary elevating of the outer ends of the fingers 68 when the first stave is fed in position, and subsequent thereto holds the ends of the fingers 68, which operate between the disks 42 and 43 and 43 and 44, down below the peripheries of these disks so that the forward edge of each stave 1 will rest directly upon the peripheries of the disks or the hoops 7 and 2 thereon.

From the foregoing it will be observed I have provided a simple machine requiring a small amount of floor space, and by means of which baskets may be rapidly made up of panels and hoops and which is conveniently controlled by a single operator. It is to be understood, of course, that any suitable means is provided adjacent the operator's position to furnish a supply of staves and hoops ready for the operator to place in the machine as required, these means not being shown and described as they form no part of the present invention and may be readily provided by any one familiar with the art of making baskets or receptacles of this type.

While I have shown and described my invention in a preferred form, I am aware that various changes and modifications may be made without departing from the principles of my invention the scope of which is to be determined by the appended claims.

I claim:

1. In a machine of the class described, the combination of a rotatable form comprising a plurality of laterally spaced members, a reciprocable feeding device having supports working between the members of the form for positioning a plurality of panels successively around the form, guides for directing bands onto the panels over the said members of the form, and fastening devices cooperating with said members to secure the bands and panels together in the form of an annular shell.

2. In a machine of the class described, the combination of a rotatable form, a feeding mechanism reciprocable laterally to and from the form for positioning a plurality of panels successively around the form, a stop and an adjusting member between which the panels on the feeding device are engaged endwise, and fastening mechanism for uniting the panels on the form so as to form an annular shell.

3. In a machine of the class described, the combination of a rotatable form, mechanism for stapling a plurality of panels together around the form to form an annular shell, a stop adjacent one end of the form, and means at the other end of the form for butting each successive panel on the form endwise against the stop.

4. In a machine of the class described, the combination of a rotatable form, a feeding device for placing a plurality of panels successively around the form, a fastening mechanism for securing the panels together so as to form an annular shell, a stop adjacent one end of the form, and a member adjacent the other end of the form and actuated by the fastening mechanism to engage the end of a panel on the form in advance of the operation of the fastening mechanism thereon and thereby butt the other end of the panel against the aforesaid stop.

5. In a machine of the class described, the combination of a form, means for imparting a step by step rotation to the form, means for feeding panels edgewise to the form transversely of the axis thereof, a panel engaging stop extending transversely across one end of the form and also in cooperative relation with the panel feeding means, and means working at the opposite end of the form to impact ends of the panels on the form against the stop to align the panel ends.

6. In a machine of the class described, the combination of a form, means for imparting a step by step rotation to the form, means for feeding panels edgewise to the form transversely of the axis thereof, a panel engaging stop extending transversely across one end of the form and in cooperative relation with the panel feeding means, panel stitching means cooperating with the form, and means working at the opposite end of the form and controlled and actuated by the panel stitching means to impact ends of the panels on the form against the stop to align the panel ends.

7. In a machine of the class described, the combination of a form, means for imparting a step by step rotation to the form, panel feeding means reciprocating transversely of the axis of the form, a panel engaging stop extending transversely across one end of the form and in cooperative relation with the panel feeding means, and means working at the opposite end of the form to impact ends of the panels on the form against the stop to align the panel ends.

8. In a machine of the class described, the combination of a form made up of spaced elements, means for imparting a step by step rotation to the form, panel feeding means working transversely of the axis of the form and provided with panel supporting members working between the members of the form, and stitching means cooperating with the members of the form.

ALBERT H. SCHMIDTKE.